United States Patent
Park et al.

(10) Patent No.: US 8,510,783 B2
(45) Date of Patent: Aug. 13, 2013

(54) VIDEO ON DEMAND TRANSMISSION/RECEPTION METHOD AND SYSTEM USING DIVIDED TRANSPORT STREAM

(75) Inventors: Sung Kwon Park, Seoul (KR); Eun Jo Lee, Gyeonggi-do (KR); Seong Min Joe, Gyeonggi-do (KR)

(73) Assignee: IUCF-HYU (Industry-University Cooperation Foundation Hanyang University, Seoul (KR)

( * ) Notice: Subject to any disclaimer, the term of this patent is extended or adjusted under 35 U.S.C. 154(b) by 917 days.

(21) Appl. No.: 12/257,588

(22) Filed: Oct. 24, 2008

(65) Prior Publication Data

US 2009/0271832 A1 Oct. 29, 2009

(30) Foreign Application Priority Data

Apr. 24, 2008 (KR) .................. 10-2008-0038340

(51) Int. Cl.
*H04N 7/173* (2011.01)

(52) U.S. Cl.
USPC ............................. 725/87; 709/231; 709/203

(58) Field of Classification Search
USPC .......................................................... 725/87
See application file for complete search history.

(56) References Cited

U.S. PATENT DOCUMENTS

| 5,935,267 | A  | * | 8/1999 | Hayakawa | 714/748 |
| 7,729,385 | B2 | * | 6/2010 | Muller et al. | 370/486 |
| 2003/0009769 | A1 | * | 1/2003 | Hensgen et al. | 725/131 |
| 2003/0037331 | A1 | * | 2/2003 | Lee | 725/32 |
| 2004/0052371 | A1 | * | 3/2004 | Watanabe | 380/233 |
| 2007/0064588 | A1 | * | 3/2007 | Kisoda et al. | 370/208 |
| 2007/0223535 | A1 | * | 9/2007 | Hamazaki | 370/486 |

* cited by examiner

*Primary Examiner* — Robert Hance
(74) *Attorney, Agent, or Firm* — Occhiuti Rohlicek & Tsao LLP

(57) ABSTRACT

Provided are a video on demand (VOD) transmission/reception method and system using a divided transport stream (TS). The VOD transmission method includes setting a division coefficient for dividing a TS; dividing the TS into a unicast segment and multicast segments according to the division coefficient; and transmitting the unicast segment by using a unicast method and transmitting the multicast segments by using a multicast method.

13 Claims, 13 Drawing Sheets

FIG. 5

| TRANSMISSION METHOD | IP | Port Number |
|---|---|---|
| Multicast 1 | 224.24.1.1 | 1001 |
| Multicast 2 | 224.24.1.2 | 1002 |
| Multicast 3 | 224.24.1.3 | 1003 |
| Multicast 4 | 224.24.1.4 | 1004 |

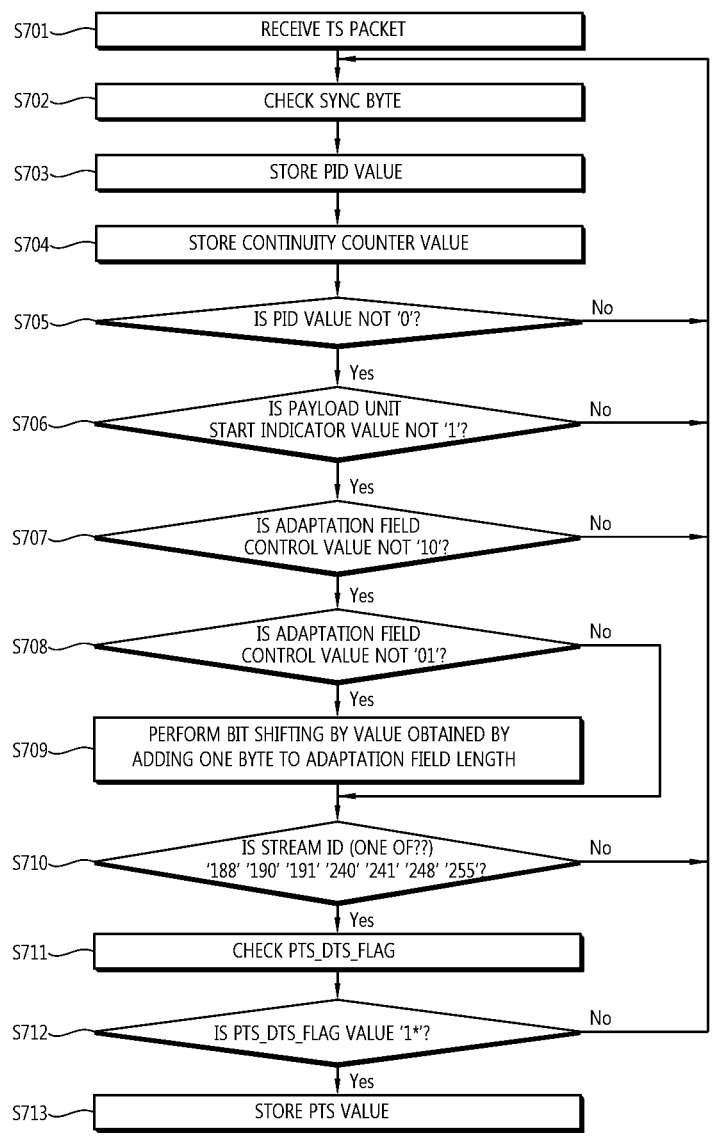

FIG. 8

| | PID | Cuntinuity_counter | PTS | Memory Address | |
|---|---|---|---|---|---|
| | 0x0271 | 8 | | | |
| | 0x0270 | 2 | | | 811 |
| | 0x0270 | 3 | | | 810 |
| REF | 0x0270 | 4 | 0x1c48f487d | TS_buffer[0] | START TO |
| | 0x0271 | 9 | | TS_buffer[1] | STORE TS PACKETS |
| | 0x0270 | 5 | | TS_buffer[2] | |
| | 0x0270 | 6 | | TS_buffer[3] | 820 |
| | 0x1FFF | | | TS_buffer[4] | |
| | 0x0270 | 14 | | TS_buffer[5] | |
| | 0x0270 | 15 | 0x1c46e787d | TS_buffer[6] | |
| | 0x0270 | 0 | | TS_buffer[7] | |
| | 0x0271 | 4 | | TS_buffer[8] | 821 |
| | 0x0270 | 1 | | TS_buffer[9] | |
| | 0x0270 | 2 | | TS_buffer[10] | |
| | 0x0271 | 3 | | TS_buffer[11] | |
| | 0x0270 | 4 | | TS_buffer[12] | |
| | 0x0270 | 5 | | TS_buffer[13] | |
| | 0x0271 | 5 | 0x1c46e887d | TS_buffer[14] | |
| | 0x0270 | 6 | | TS_buffer[15] | |
| | 0x0270 | 8 | | TS_buffer[16] | |
| | 0x0270 | 7 | | TS_buffer[17] | |
| | 0x0270 | 8 | | TS_buffer[18] | |
| | 0x0271 | 6 | | TS_buffer[19] | |
| | 0x0270 | 9 | 0x1c47e887d | TS_buffer[20] | |
| | 0x0270 | 10 | | TS_buffer[21] | |
| | 0x0270 | 11 | | TS_buffer[22] | |
| | 0x0271 | 12 | | TS_buffer[23] | |
| | 0x0270 | 13 | | TS_buffer[24] | |
| | 0x1FFF | | | TS_buffer[25] | 830 |
| | 0x0271 | 7 | 0x1c47e8f7d | TS_buffer[26] | |
| | 0x0270 | 14 | | TS_buffer[27] | |
| | 0x0270 | 15 | | TS_buffer[28] | |
| | 0x0270 | 9 | | TS_buffer[29] | |
| | 0x0270 | 0 | 0x1c47f487d | TS_buffer[30] | |
| | 0x0270 | 1 | | TS_buffer[31] | |
| | 0x0271 | 8 | 0x1c47f412d | TS_buffer[32] | |
| | 0x0270 | 2 | | TS_buffer[33] | |
| | 0x0270 | 3 | | TS_buffer[34] | 840 |
| | 0x0270 | 4 | 0x1c48f487d | | TS PACKETS ARE REPEATED, TRANMIT IGMP LEAVE MESSAGE |

FIG. 9

| | PID | Cuntinuity_counter | PTS | memory Address | |
|---|---|---|---|---|---|
| | 0x0270 | 14 | | TS_buffer[5] | |
| | 0x0270 | 15 | 0x1c46e787d | TS_buffer[6] | |
| | 0x0270 | 0 | | TS_buffer[7] | |
| | 0x0271 | 4 | | TS_buffer[8] | |
| | 0x0270 | 1 | | TS_buffer[9] | |
| | 0x0270 | 2 | | TS_buffer[10] | |
| | 0x0270 | 3 | | TS_buffer[11] | |
| | 0x0270 | 4 | | TS_buffer[12] | |
| | 0x0270 | 5 | | TS_buffer[13] | |
| | 0x0271 | 5 | 0x1c46e887d | TS_buffer[14] | |
| | 0x0270 | 6 | | TS_buffer[15] | |
| | 0x0270 | 8 | | TS_buffer[16] | |
| | 0x0270 | 7 | | TS_buffer[17] | |
| | 0x0270 | 8 | | TS_buffer[18] | |
| | 0x0271 | 6 | | TS_buffer[19] | |
| | 0x0270 | 9 | 0x1c47e887d | TS_buffer[20] | |
| | 0x0270 | 10 | | TS_buffer[21] | |
| | 0x0270 | 11 | | TS_buffer[22] | |
| | 0x0270 | 12 | | TS_buffer[23] | |
| | 0x0270 | 13 | | TS_buffer[24] | |
| | 0x0271 | 7 | 0x1c47e8f7d | TS_buffer[26] | |
| | 0x0270 | 14 | | TS_buffer[27] | |
| | 0x0270 | 15 | | TS_buffer[28] | |
| | 0x0270 | 9 | | TS_buffer[29] | |
| | 0x0270 | 0 | 0x1c47f487d | TS_buffer[30] | |
| | 0x0270 | 1 | | TS_buffer[31] | |
| | 0x0271 | 8 | 0x1c47f412d | TS_buffer[32] | |
| | 0x0270 | 2 | | TS_buffer[33] | |
| | 0x0270 | 3 | | TS_buffer[34] | |
| REF | 0x0270 | 4 | 0x1c48f487d | TS_buffer[0] | ~S910 |
| | 0x0271 | 9 | | TS_buffer[1] | |
| | 0x0270 | 5 | | TS_buffer[2] | |
| | 0x0270 | 6 | | TS_buffer[3] | |

VIDEO ON DEMAND TRANSMISSION/RECEPTION METHOD AND SYSTEM USING DIVIDED TRANSPORT STREAM

CROSS-REFERENCE TO RELATED PATENT APPLICATION

This application claims the benefit of Korean Patent Application No. 10-2008-0038340, filed on Apr. 24, 2008, in the Korean Intellectual Property Office, the disclosure of which is incorporated herein in its entirety by reference.

BACKGROUND OF THE INVENTION

1. Field of the Invention

The present invention relates to a video on demand (VOD) transmission/reception method and system, and more particularly, to a VOD transmission/reception method and system using a divided transport stream (TS).

2. Description of the Related Art

Currently, due to broadened networks and developed broadcasting technologies, a video on demand (VOD) service is regarded as a new value-added business. The VOD service is a bidirectional service by which digital data such as movie, education, game, and shopping video data can be provided to a plurality of users at remote places by using a communication network. Video such as moving image data and audio data has a very large capacity even after being compressed. When the video data is transmitted through a network, a very large number of channel bandwidths requiring considerable costs have to be ensured. Thus, bandwidths need to be efficiently used in the VOD service.

The VOD service is divided into a true VOD (TVOD) service and a near VOD (NVOD) service according to a video transmission method. The TVOD service allows each viewer to select and view a desired program at a desired time, and provides various multimedia contents to viewers by using a unicast method. In spite of advantages as an interactive service, the TVOD service has disadvantages in that a large number of bandwidths are required because the viewers occupy transmission channels from a content server to the viewers' terminals, and thus a large amount of money is required to ensure the bandwidths. On the other hand, in spite of disadvantages of a non-interactive service and the viewers' waiting time, the NVOD service sequentially and repeatedly transmits one video program through a plurality of broadcasting channels. The NVOD service greatly reduces systematic costs by providing video data to a plurality of viewers through one video channel. The NVOD service requires a greatly less number of channels in comparison to the TVOD service. However, a large number of viewers cannot immediately view requested video data.

A current Internet protocol television (IPTV) service has traffic such as real-time broadcasting, TVOD transmission, and NVOD transmission. For example, in order to provide the TVOD service, a standard definition television (SDTV) requires a bit-rate of 2~6 megabits per second (Mbps) and a high definition television (HDTV) requires a bit-rate of 6~20 Mbps. Also, an additional bandwidth is required for each of service users. Obviously, the bit-rate can vary according to a compression method of corresponding contents. However, traffic of several gigabits per second (Gbps) naturally occurs to a content provider providing the TVOD service, in order to ensure the above bit-rate for each of the service users.

As a result, in consideration of all types of traffic including signals for a service, as well as content data, a huge amount of transmission traffic occurs in a whole backbone network when VOD services as well as the TVOD service are provided. Also, large variations in a transmission amount according to times when network users use a network are expected in the TVOD service. Accordingly, a method of expecting a required service amount and efficiently providing a TVOD service is demanded.

SUMMARY OF THE INVENTION

The present invention provides a true video on demand (TVOD) transmission/reception method and system by which a service user may immediately view VOD contents upon a request of the service user.

The present invention also provides a TVOD service providing method and system by which bandwidths may be efficiently used.

The present invention also provides a TVOD transmission/reception method and system by which a required service amount may be expected.

The present invention also provides a TVOD transmission/reception method and system by which divided multicast segments may be efficiently transmitted.

According to an aspect of the present invention, there is provided a video on demand (VOD) transmission method using a divided transport stream (TS), the VOD transmission method including setting a division coefficient for dividing a TS; dividing the TS into a unicast segment and multicast segments according to the division coefficient; and transmitting the unicast segment by using a unicast method and transmitting the multicast segments by using a multicast method.

The dividing of the TS may include extracting a total number of bytes of the TS; calculating a total number of TS packets by dividing the total number of bytes of the TS by a TS packet size; and calculating a multicast segment size by multiplying the total number of the TS packets by the TS packet size.

The dividing of the TS may include calculating a total number of packets of the multicast segments by multiplying the total number of packets of the multicast segments by a value obtained by subtracting one from the division coefficient; and calculating a unicast segment size by multiplying the TS packet size by a value obtained by subtracting the total number of packets of the multicast segments from the total number of the TS packets.

According to another aspect of the present invention, there is provided a video on demand (VOD) reception method using a divided transport stream (TS), the VOD reception method including receiving a content transmission request; receiving a scheduling table from a transmission terminal; receiving a unicast segment from the transmission terminal; and receiving multicast segments from the transmission terminal.

According to another aspect of the present invention, there is provided a video on demand (VOD) reception method using a divided transport stream (TS), the VOD reception method including receiving a TS in TS packets; extracting presentation time stamp (PTS) information from the TS packets; and realigning the TS by using the PTS information.

According to another aspect of the present invention, there is provided a video on demand (VOD) transmission system using a divided transport stream (TS), the VOD transmission system including a division coefficient setting unit setting a division coefficient for dividing a TS; a segment size calculation unit calculating a unicast segment size and a multicast segment size for dividing the TS into a unicast segment and multicast segments according to the division coefficient; and a segment transmission unit transmitting one or more divided segments by using a unicast method or a multicast method.

According to another aspect of the present invention, there is provided a video on demand (VOD) reception system using a divided transport stream (TS), the VOD reception system including a segment reception unit receiving unicast and multicast segments from a transmission terminal; a TS packet analysis unit analyzing TS packets of the unicast and multicast segments; and a packet alignment unit realigning the TS packets.

BRIEF DESCRIPTION OF THE DRAWINGS

The above and other features and advantages of the present invention will become more apparent by describing in detail exemplary embodiments thereof with reference to the attached drawings in which:

FIG. 5 is a diagram of a scheduling table when a division coefficient is set to be four, according to an embodiment of the present invention;

FIG. 7 is a flowchart of a method of analyzing a TS packet after the TS packet is received, according to an embodiment of the present invention;

FIG. 8 is a diagram of a TS packet reception table according to an embodiment of the present invention;

FIG. 9 is a diagram of a TS packet reception table in which TS packets are realigned, according to an embodiment of the present invention;

DETAILED DESCRIPTION OF THE INVENTION

Hereinafter, the present invention will be described in detail by explaining embodiments of the invention with reference to the attached drawings.

Figure 1:
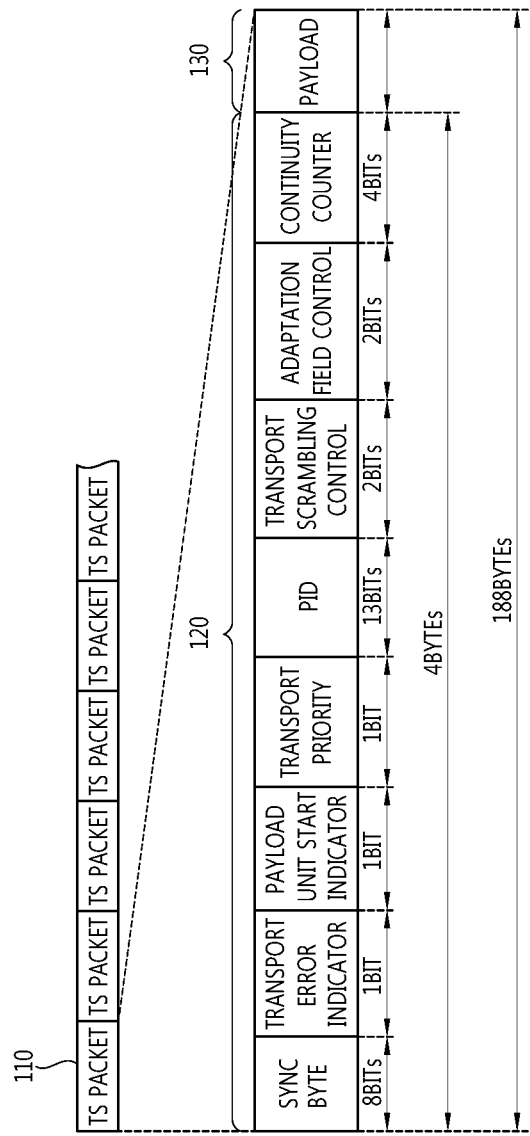
FIG. 1 is a diagram showing a structure of a transport stream (TS) packet according to a Moving Picture Expert Group 2 (MPEG2)-TS standard (International Organization for Standardization (ISO)/International Electrotechnical Commission (IEC) standard 13818-1)

FIG. 1 is a diagram showing a structure of a transport stream (TS) packet 110 according to a Moving Picture Expert Group 2 (MPEG2)-TS standard (International Organization for Standardization (ISO)/International Electrotechnical Commission (IEC) standard 13818-1). The structure of the TS packet 110 illustrated in FIG. 1 is well-known and thus detailed descriptions thereof will be omitted here. Also, the structure of the TS packet 110 is exemplarily illustrated and it will be clearly understood by one skilled in the art that the present invention is not limited to the structure of the TS packet 110 according to the MPEG2-TS standard.

In general, in order to transmit contents, audio information, video information, and data information are pre-processed and are encoded. Then, each of the audio information, the video information, and the data information is converted into a bitstream that is referred to as an elementary stream (ES). The ES of each of the audio information, the video information, and the data information is converted into packets in order to determine a compression unit. A converted packet is referred to as a packetized elementary stream (PES) packet. The PES packet consists of a header and a payload. The header indicates a start of a compression unit and contains information regarding the payload.

An audio PES, a video PES, and a data PES each including sequential PES packets are time-division multiplexed and thus are converted into a TS. For example, when an audio PES and a video PES are multiplexed so as to generate a TS, initially, the audio PES is divided by 184 bytes and the video PES is also divided by 184 bytes. Then, a header of 4 bytes is added to each 184 bytes so as to generate the TS packet 110 of 188 bytes. Audio TS packets and video TS packets are time-division multiplexed and thus are converted into a TS. Referring to FIG. 1, a header 120 of the TS packet 110 consists of a sync byte field of eight bits, a transport error indicator field of one bit, a payload unit start indicator field of one bit, a transport priority field of one bit, a packet identifier (PID) field of thirteen bits, a transport scrambling control field of two bits, an adaptation field control field of two bits, and a continuity counter field of four bits. The adaptation field control field indicates whether an adaptation field and/or a payload 130 is subsequent to the header 120. If the adaptation field control field has a value '0', the header 120 is not followed by the adaptation field and is followed by only the payload 130. On the other hand, if the adaptation field control field has a value '1', the header 120 is followed by the adaptation field. If the adaptation field is subsequent to the header 120, the adaptation field may or may not have an option field. The option field may be used for extending the header 120.

Figure 2:
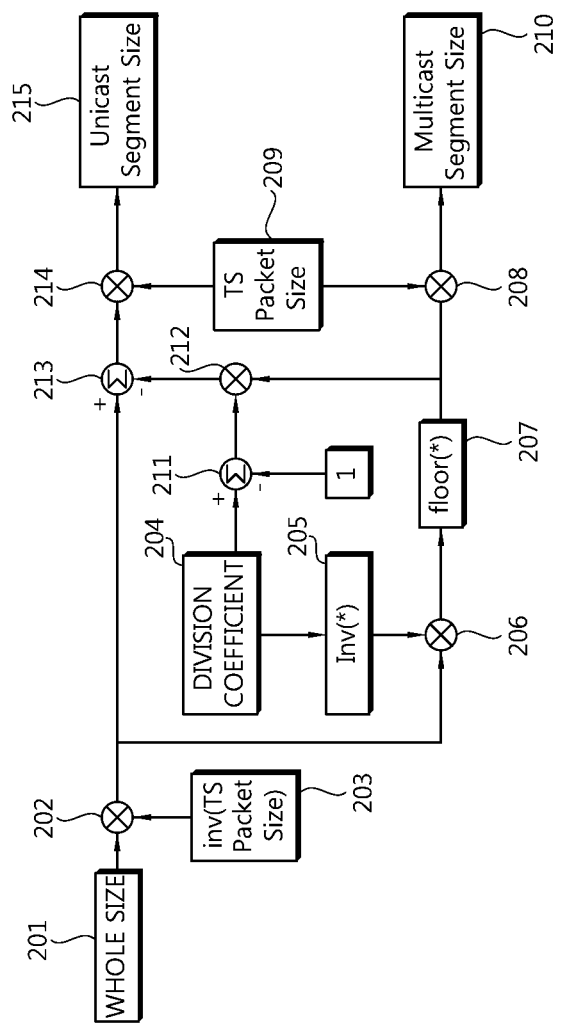
FIG. 2 is a block diagram for describing a method of determining unicast/multicast segment sizes when a TS is divided, according to an embodiment of the present invention.

FIG. 2 is a block diagram for describing a method of determining a multicast segment size 210 and a unicast segment size 215 when a TS is divided, according to an embodiment of the present invention.

Referring to FIG. 2, when the multicast segment size 210 is determined, initially, a first multiplier 202 may multiply a whole TS size 201 by an inverse TS packet size 203 so as to calculate a total number of TS packets included in the TS, which corresponds to a value obtained by dividing the whole TS size 201 by a TS packet size 209 (188 bytes). Then, a second multiplier 206 may multiply the total number of the TS packets by an inverse number 205 of a division coefficient 204 so as to divide the total number of the TS packets by the division coefficient 204. Also, a Floor 207 applys truncation of decimal points on a value obtained by dividing the total number of the TS packets by the division coefficient 204. The third multiplier 208 multiplies the integer 207 by the TS packet size 209 so as to determine the multicast segment size 210. Here, the division coefficient 204 may vary according to, for example, a transmission environment.

In addition, when the unicast segment size 215 is determined, a fourth multiplier 212 multiplies a value obtained when a first adder-subtracter 211 subtracts one from the division coefficient 204, by the integer 207 calculated when the multicast segment size is determined. Then, a second adder-subtracter 213 subtracts a value calculated by the fourth multiplier 212 from the total number of the TS packets, which is calculated by the first multiplier 202. The fifth multiplier 214 multiplies a value calculated by the second adder-subtracter 213, by the TS packet size 209 so as to determine the unicast segment size 215.

In this case, if a first segment is divided from the TS as a unicast segment by using the unicast segment size 215 and then a remaining portion of the TS is divided into a plurality of multicast segments by using the multicast segment size 210, the TS may be divided into a plurality of segments corresponding to the division coefficient 204.

Also, after the TS is divided, the size of the unicast segment is always greater than or equal to the size of the multicast segments.

As such, the TS may be divided based on the unicast segment size 215 and the multicast segment size 210. The divided unicast segment may be transmitted by using a unicast method and the divided multicast segments may be transmitted by using a multicast method. Accordingly, additional bandwidths are used only for a predetermined period of time and the number of bandwidths to be used gets back to normal immediately after the predetermined period of time. Thus, the bandwidths may be efficiently used.

Figure 3:
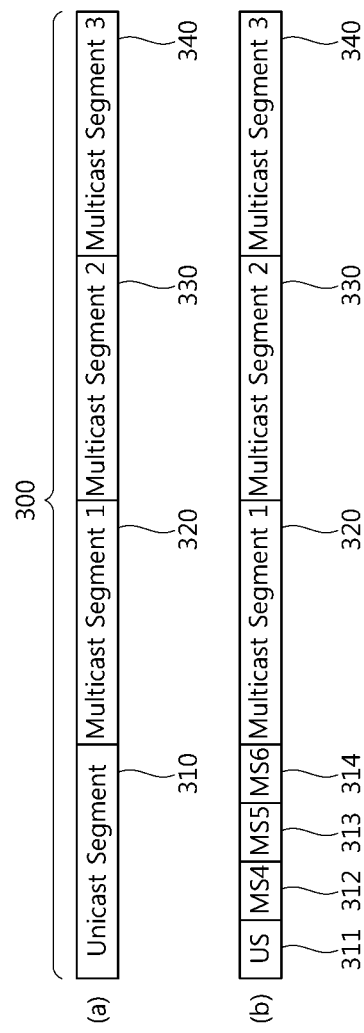
FIGS. 3A and 3B are diagrams showing results obtained when a TS is divided by setting a division coefficient to be four, according to an embodiment of the present invention.

FIGS. 3A and 3B are diagrams showing results obtained when a TS 300 is divided by setting a division coefficient to be four, according to an embodiment of the present invention.

Referring to FIGS. 3A and 3B, a result shown in FIG. 3A may be obtained when the division coefficient is set to be four and the TS 300 is divided as described above with reference to FIG. 2, and a result shown in FIG. 3B may be obtained when the TS 300 is additionally divided.

After the TS 300 is divided, the size of a unicast segment 310 is always greater than or equal to the size of each of first through third multicast segments 320, 330, and 340. In more detail, since a multicast segment size is determined based on a value obtained by performing a floor function on a value obtained by dividing a total number of TS packets by four that is the division coefficient, the multicast segment size is less than or equal to the size of a quarter of the TS 300. Thus, a value obtained by multiplying the multicast segment size by three is less than or equal to the size of three quarters of the TS 300. Also, since a unicast segment size is determined based on a value obtained by subtracting the value obtained by multiplying the multicast segment size by three, from the size of the TS 300, the unicast segment size is always greater than or equal to the size of the quarter of the TS 300. Accordingly, the size of the unicast segment 310 is always greater than or equal to the size of the first through third multicast segments 320, 330, and 340.

A VOD transmission/reception system according to an embodiment of the present invention transmits the unicast segment 310 by using a unicast method so that a viewer may immediately view desired video on demand (VOD) contents upon a request of the viewer, and repeatedly transmits the other segments by using a multicast method. In this case, since the unicast segment size is always greater than or equal to the multicast segment size, although the viewer joins a multicast group at any location of the first multicast segment 320, entire data of the first multicast segment 320 may be completely received before contents transmitted by using the unicast segment 310 are completely viewed.

Likewise, the size of an additionally divided unicast segment 311 is always greater than or equal to the size of each of fourth through sixth multicast segments 312, 313, and 314.

Figure 4:
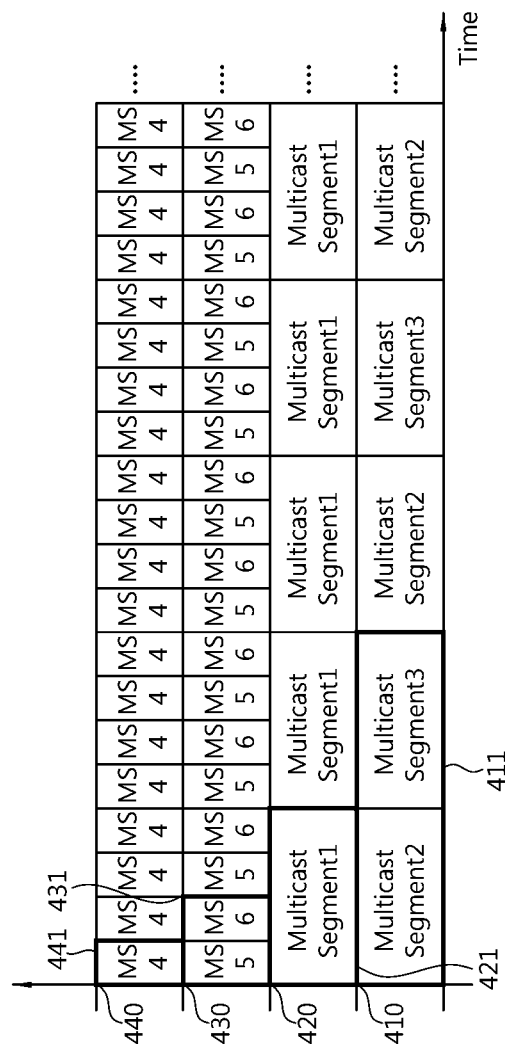
FIG. 4 is a diagram for describing a method of transmitting multicast segments through one or more links, according to an embodiment of the present invention.

FIG. 4 is a diagram for describing a method of transmitting multicast segments through one or more links, according to an embodiment of the present invention.

Referring to FIG. 4, six multicast segments start to be transmitted through four links. A fourth multicast segment 441 is transmitted through a first link 440, fifth and sixth multicast segments 431 are transmitted through a second link 430, a first multicast segment 421 is transmitted through a third link 420, second and third multicast segments 411 are transmitted through a fourth link 410, by using a multicast method. In this case, a corresponding stream is repeatedly transmitted through each link. When each segment is repeated, a null packet having a PID of 0x1FFF is inserted into behind the segment so that a receiver can identify the segment when segments are not sequentially received according to values of continuity counter fields or presentation time stamp (PTS) fields. In this case, in order to efficiently transmit divided multicast segments, in addition to existing electronic program guide (EPG)-based information, scheduling information is additionally and essentially required. In more detail, after a scheduling table is transmitted, the divided multicast segments may be transmitted through links. The scheduling table will now be described in detail with reference to FIG. 5.

FIG. 5 is a diagram of a scheduling table when a division coefficient is set to be four, according to an embodiment of the present invention.

Referring to FIG. 5, the scheduling table may include items such as transmission method, multicast Internet protocol (IP) address, and port number. As illustrated in FIG. 5, by transmitting the scheduling table, for example, information indicating a first multicast method 510 transmits segments to a port number 1001 530 at an IP address 224.24.1.1 520, may be informed in advance. In more detail, a transmitter transmits scheduling information required to receive segments, to a receiver before starting to transmit the segments, and thus the receiver such as an IP set-top-box (STB) may start to receive the segments. The scheduling information may be formed based on text and be immediately transmitted upon a content request of a viewer. As such, multicast segments may be more efficiently transmitted by transmitting the scheduling table in advance before transmitting the multicast segments.

Figure 6:
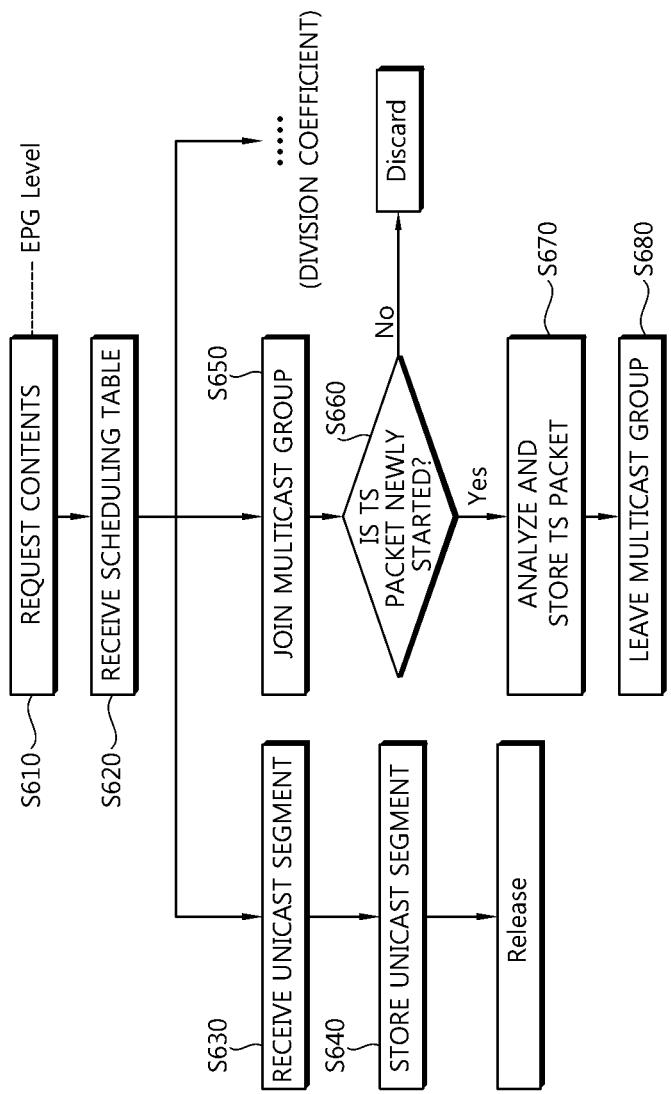
FIG. 6 is a flowchart of a method of receiving segments, according to an embodiment of the present invention.

FIG. 6 is a flowchart of a method of receiving segments, according to an embodiment of the present invention.

Referring to FIG. 6, in operation S610, an EPG level of a STB may request contents. In operation S620, initially, a scheduling table for transmitting multicast segments may be received. In more detail, the scheduling table may be received in advance in order to more efficiently receive the multicast segments. In operation S630, a unicast segment may be received in a unicast listening mode, and, in operation S640, the received unicast segment may be stored.

Then, in operation S650, a join message may be transmitted to a multicast router in order to receive each multicast segment according to the scheduling table. In operation S660, a newly started TS packet of received data may be stored with priority by performing a TS sync byte block compare process. In operation S670, a TS packet reception table of TS packets received after joining a multicast group may be formed, segments received through each link may be stored in TS packets, and a value of a presentation time stamp (PTS) field of each of the received TS packets may be extracted and stored in order to realign the received TS packets. In operation S680, if the receiving of the TS packets are completed, a leave messages is transmitted so as to leave the multicast group. As such, only a predetermined portion of the TS is transmitted/received by using a unicast method and then remaining data is transmitted/received by using a multicast method. Accordingly, additional bandwidths are used only for a predetermined period of time and the number of bandwidths to be used gets back to normal immediately after the predetermined period of time.

The above method of receiving a multicast segment may be performed on each of one or more multicast segments according to a division coefficient.

FIG. 7 is a flowchart of a method of analyzing a TS packet after the TS packet is received, according to an embodiment of the present invention.

Referring to FIG. 7, in operation S701, initially, a TS packet analyzer receives the TS packet. In operation S702, it is determined whether the TS packet is a newly started TS packet by checking a sync byte field (0x47) included in a header of the TS packet, so as to store the newly started TS packet. In operation S703, a value of a PID field of the TS packet is stored, and, in operation S704, a value of a continuity counter field is read and stored in a TS packet reception table.

In operation S705, it is determined whether the PID field has a value '0'. If the PID field does not have a value '0', in operation S706, a value of a payload unit start indicator field is checked. In this case, the value of the payload unit start indicator field may vary according to types of data in a payload. If the payload contains PES data, the payload unit start indicator field contains a first start packet of a PES. That is, the payload starts with a first byte of the PES. If the payload contains program specific Information (PSI) data, a first byte of the payload is a pointer field indicating a location of the PSI data. In more detail, one byte behind the header indicates after how many bytes the PSI data exists. This is because, unlike the PES data, a start byte of the PSI data does not need to be located at the beginning of the TS packet. In other words, if the payload unit start indicator field has a value '1', the payload of the TS packet starts with a first byte of a PES packet, which means that the TS packet includes a header of the PES packet.

In operation S707, it is checked whether an adaptation field control field has a value '10'. The adaptation field control field indicates whether an adaptation field exists. In more detail, if the adaptation field control field has a value '10', the payload does not exist, which means that a presentation time stamp (PTS) field does not exist, either. In this case, the subsequent TS packet is processed. In operation S708, it is checked whether the adaptation field control field has a value '01'. If the adaptation field control field has a value '01', the header is followed by the payload without the adaptation field, which means the first byte of the payload is regarded as a start location of the header of the PES packet. In this case, the header of the PES packet may immediately start to be analyzed. In operation S709, if the adaptation field control field has a value '11', the adaptation field exists and thus an adaptation field length of the adaptation field is checked.

In more detail, in order to form a TS, a first byte of a PES packet has to be located at a start location of the TS. As such, if PES packets are filled in a payload, stuffing bytes have to be filled in a remaining portion of the payload of the TS packet. In this case, a stuffing portion of the adaptation field fills the remaining portion. The adaptation field length includes a length of the stuffing bytes. The adaptation field may contain program clock reference (PCR) information. Thus, if bit shifting is performed by a value obtained by adding the adaptation field length to one byte that is the size of the adaptation field length, a result of the bit shifting corresponds to a start location of the payload of the TS and thus the first byte may be regarded as the start location of the header of the PES packet.

After the start location is found as the first byte of the PES packet, the header of the PES packet is checked. A packet start code field of thirty two bits consists of a packet start code prefix field of twenty four bits and a stream id field of eight bits. The packet start code prefix field indicates a start bit as 0x000001 and the stream id field indicates the type and number of an ES. If the stream id field is padded, the stream id field does not contain any information and is merely padded. Thus, an optional_PES_header and a payload are filled with padding bits containing no information.

In operation S710, it is checked whether the stream id field indicates one of a private_stream 2, a program_stream_map, an entitlement control message (ECM), an entitlement management message (EMM), a program stream directory, a digital storage media command and control (DSMCC) stream the International Telecommunication Union (ITU) Telecommunication Standardization Sector (ITU-T) Rec.H.221.1 type E, because all of the optional_PES_header and PES packet data bytes are filled with the payload. In operation S711, a PTS-_decode time stamp (DTS)_flag of the optional_PES_header is checked. In operation S712, it is checked whether a first bit of two bits of the PTS_DTS_flag has a value '1'. If the PTS_DTS_Flag has a value '10', the header of the PES packet contains PTS information. If the PTS_DTS_flag has a value '11', the header of the PES packet contains the PTS information and DTS information. A value '00' indicates that neither the PTS information nor the DTS information exists and a value '01' is not allowed to use. Accordingly, if the first bit of the two bits of the PTS_DTS_flag has a value '1', the PTS information exists and thus a value of the PTS field may be read. In this case, the PTS field totally includes thirty three bits that are divided into fifteen bits, fifteen bits, and three bits. A market bit that is fixed to have a value '1' is inserted between the fifteen bits, the fifteen bits, and the three bits in order to prevent a case that only a value '0' is repeated in the PTS field or that the PTS field is wrongly regarded as the packet start code field.

Then, in operation S713, the value of the PTS field may be stored in the TS packet reception table. In more detail, the TS packet reception table may be formed by using at least one of the values of the PID field, the continuity counter field, and the PTS field, and, for example, the value of the PTS field may be used to realign received TS packets.

FIG. 8 is a diagram of a TS packet reception table according to an embodiment of the present invention.

Referring to FIG. 8, values of a PID field, a continuity counter field, and a PTS field may be extracted from each of received TS packets and the TS packet reception table may be formed by storing the values. In this case, a first TS packet having values of all of the PID field, the continuity counter field, and the PTS field, may be set as a reference packet 810. Since steams are repeatedly received through a link, the reference packet 810 is set in order to recognize that a TS packet is repeatedly received. Thus, if a TS packet 840 that is identical to the reference packet 810 is received, an Internet group management protocol (IGMP) leave message may be transmitted so as to terminate receiving of TS packets through a link through which the TS packet 840 is received.

In this case, the received TS packets may be realigned. Initially, the TS packet reception table is attempted to be realigned in a descending order according to PTS information of the TS packet reception table. If values of PTS fields are reversed with reference to a null packet having a PID of '0x1FFF', the TS packets are realigned with reference to a location of the null packet. For example, if values of PTS fields are reversed with reference to a first null packet received after the TS packets are received, TS packets from a first TS packet from among stored TS packets to the first null packet are realigned at the bottom of the TS packet reception table. If values of PTS fields are reversed with reference to a last null packet of the TS packet reception table, TS packets from the last null packet to a last TS packet of the TS packet reception table are realigned at the top of the TS packet reception table. In FIG. 8, a value 811 (0x1 c48f487d) of a PTS field of the reference packet 810 and a value 821 (0x1 c46e787d) of a PTS field of a TS packet below a null packet 820 are reversed with reference to the null packet 820. Thus, in this case, TS packets from the reference packet 810 to the null packet 820 may be realigned at the bottom of the TS packet reception table. Then, discontinuity of values of continuity counter fields is checked with regard to each PID on the TS packet reception table. If the discontinuity occurs, corresponding TS packets are realigned. Ultimately, all null packets having a PID of '0x1FFF', which are not required to decode streams, may be removed from the TS packet reception table so as to completely form the TS packet reception table.

FIG. 9 is a diagram of a TS packet reception table in which TS packets are realigned, according to an embodiment of the present invention.

Referring to FIG. 9, the TS packet reception table of FIG. 9 is obtained when received TS packets are realigned from the TS packet reception table of FIG. 8 due to reversion of values of PTS fields. As a result of realignment, a location of the reference packet 810 of FIG. 8 is changed into a location of a reference packet 910. In this case, if segments received through an individual multicast link are completely realigned as in FIG. 9, the TS packet reception table and TS packet reception tables of TS packets received through other unicast and multicast links are attempted to be realigned. The TS packet reception tables may be sequentially realigned by comparing values of PTS fields of reference packets of the TS packet reception tables.

Figure 10:
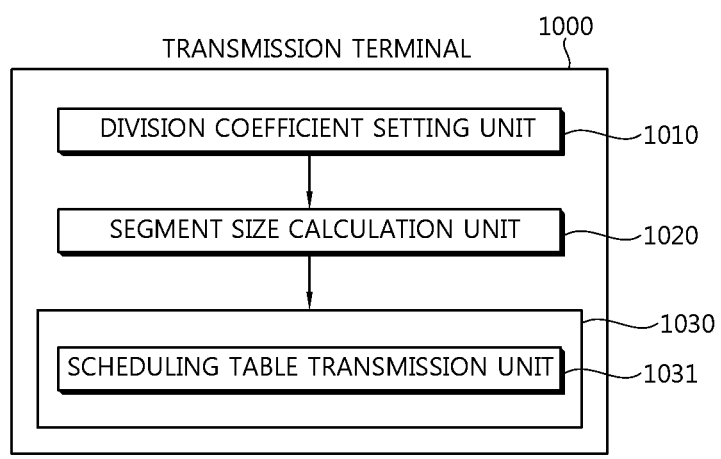
FIG. 10 is a block diagram of a video on demand (VOD) transmission terminal device using a divided TS, according to an embodiment of the present invention.

FIG. 10 is a block diagram of a VOD transmission terminal device 1000 using a divided TS, according to an embodiment of the present invention.

Referring to FIG. 10, the VOD transmission terminal device 1000 includes a division coefficient setting unit 1010, a segment size calculation unit 1020, and a segment transmission unit 1030.

The division coefficient setting unit 1010 sets a division coefficient for dividing a TS into a unicast segment and multicast segments. In this case, the division coefficient may be differently set according to, for example, a transmission environment. The segment size calculation unit 1020 calculates a unicast segment size and a multicast segment size for dividing the TS into the unicast segment and the multicast segments according to the division coefficient. The unicast segment size has to be always greater than or equal to the multicast segment size. As such, although a viewer joins a multicast group at any location of a multicast segment, entire data of the multicast segment may be completely received before contents transmitted by using the unicast segment are completely viewed.

The segment transmission unit 1030 transmits the unicast segment by using a unicast method and transmits the multicast segments by using a multicast method. In this case, the segment transmission unit 1030 may include a scheduling table transmission unit 1031 transmitting a scheduling table for efficiently transmitting the multicast segments. In more detail, in order to efficiently transmit the multicast segments, in addition to existing EPG-based information, scheduling information is additionally and essentially required. Thus, the multicast segments may be more efficiently transmitted by transmitting the scheduling table in advance.

Figure 11:
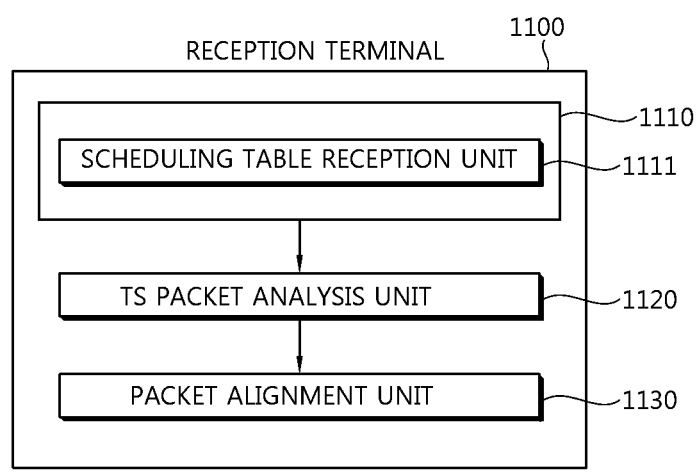
FIG. 11 is a block diagram of a VOD reception terminal device using a divided TS, according to an embodiment of the present invention.

FIG. 11 is a block diagram of a VOD reception terminal device 1100 using a divided TS, according to an embodiment of the present invention.

Referring to FIG. 11, the VOD reception terminal device 1100 includes a segment reception unit 1110, a TS packet analysis unit 1120, and a packet alignment unit 1130.

The segment reception unit 1110 receives a unicast segment transmitted by using a unicast method and multicast segments transmitted by using a multicast method. In this case, the segment reception unit 1110 may include a scheduling table reception unit 1111 receiving a scheduling table for receiving the multicast segments.

The TS packet analysis unit 1120 analyzes received TS packets and may extract at least one of values of a PID field, a continuity counter field, and a PTS field of each of the received TS packets. In this case, the extracted values may be used to form a TS packet reception table.

The packet alignment unit 1130 realigns the received TS packets. Values of PTS fields of the TS packets may be used to realign the TS packets. In more detail, the TS packets may be realigned so that the values of the PTS fields are aligned in a descending order. Also, if the TS packets of each segment are completely realigned, realignment between segments may be performed by comparing values of PTS fields of reference packets of the segments and aligning the values of the PTS fields in a descending order.

Figure 12:
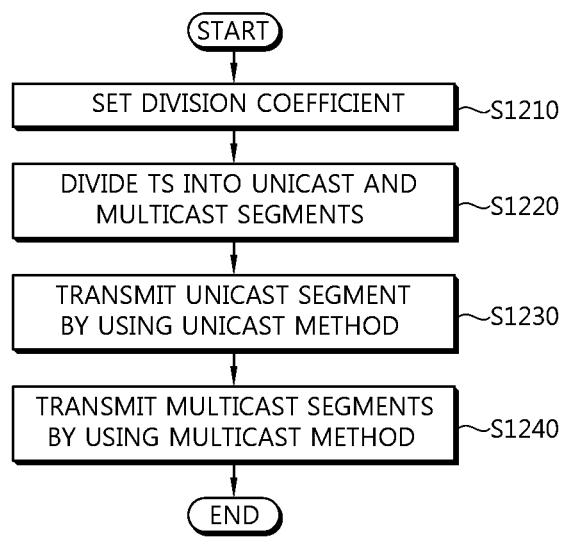
FIG. 12 is a flowchart of a VOD transmission method using a divided TS, according to an embodiment of the present invention.

FIG. 12 is a flowchart of a VOD transmission method using a divided TS, according to an embodiment of the present invention.

Referring to FIG. 12, in operation S1210, a division coefficient for dividing a TS may be set. In this case, the division coefficient may be differently set according to, for example, a transmission environment. In operation S1220, the TS may be divided into a unicast segment and multicast segments according to the division coefficient. In this case, the size of the unicast segment is always greater than or equal to the size of the multicast segments. In operation S1230, the unicast segment may be transmitted by using a unicast method. In more detail, only a predetermined portion of the TS is transmitted by using the unicast method and remaining data is transmitted by using a multicast method. Accordingly, additional bandwidths are used only for a predetermined period of time and thus bandwidths may be efficiently used. In this case, operation S1230 may further include transmitting a scheduling table for efficiently transmitting the multicast segments.

Then, in operation S1240, the multicast segments are transmitted by using the multicast method. In more detail, after the unicast segment is transmitted by using the unicast method in operation S1230, the remaining data may be transmitted by using the multicast method. In this case, when a multicast segment is repeatedly transmitted, a null packet having a PID of 0x1FFF may be inserted into behind the multicast segment. As such, a receiver can identify each segment by using the null packet when segments are not sequentially received according to values of continuity counter fields or PTS fields.

Figure 13:
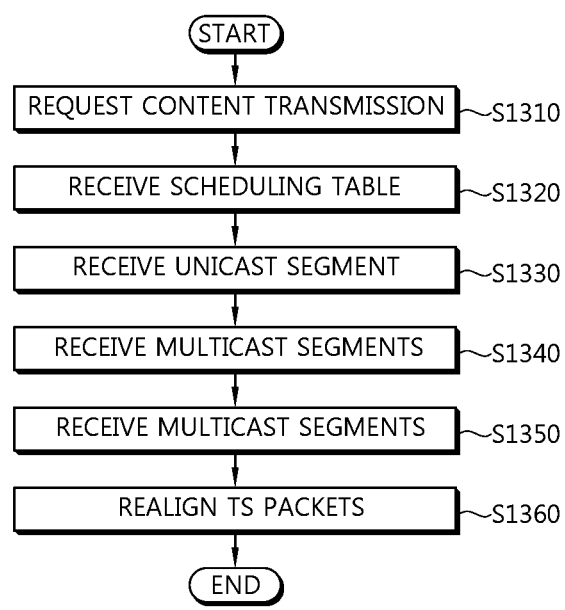
FIG. 13 is a flowchart of a VOD reception method using a divided TS, according to an embodiment of the present invention.

FIG. 13 is a flowchart of a VOD reception method using a divided TS, according to an embodiment of the present invention.

Referring to FIG. 13, in operation S1310, an EPG level of a STB may request contents. In operation S1320, a scheduling table is received in order to receive the contents. The scheduling table may include at least one of one or more multicast addresses and port numbers. In operation S1330, a unicast segment is received in a unicast listening mode. As such, only a predetermined portion of a TS is received by using a unicast method and thus bandwidths may be efficiently used.

Then, in operation S1340, multicast segments are received by using the scheduling table. In this case, in order to receive the multicast segments, a join message is transmitted to a multicast router and a viewer may join a multicast group. In operation S1350, received segments are stored in TS packets. In this case, when the multicast segments are stored, a TS packet reception table of received TS packets may be formed such that each segment received through a link through which the segment is transmitted, may be stored in TS packets. Also, values of PTS fields of the received TS packets may be checked in order to realign streams of the received TS packets.

In operation S1360, the received TS packets are realigned. In this case, TS packets of each segment may be realigned by comparing values of PTS fields of the TS packets so that the values of the PTS fields are aligned in a descending order. Also, after the TS packets of each segment are realigned, realignment between segments may be performed by comparing values of PTS fields of reference packets of the segments and aligning the values of the PTS fields in a descending order.

The above-described present invention includes a computer readable medium including a program instruction for executing various operations realized by a computer. The computer readable medium may include a program instruction, a data file, and a data structure, separately or cooperatively. The program instructions and the media may be those specially designed and constructed for the purposes of the present invention, or they may be of the kind well known and available to those skilled in the art of computer software arts. Examples of the computer readable media include magnetic media (e.g., hard disks, floppy disks, and magnetic tapes), optical media (e.g., CD-ROMs or DVD), magneto-optical media (e.g., floptical disks), and hardware devices (e.g., ROMs, RAMs, or flash memories, etc.) that are specially configured to store and perform program instructions. Examples of the program instructions include both machine code, such as produced by a compiler, and files containing high-level languages codes that may be executed by the computer using an interpreter.

According to the above embodiments of the present invention, by transmitting/receiving TVOD contents by dividing a TS, when streams are transmitted, a unicast method may be rapidly switched into a multicast method. Thus, a viewer may immediately view the TVOD contents upon a request of the viewer and bandwidths may be efficiently used. Also, additional bandwidths may be used only for a predetermined period of time and the number of bandwidths to be used gets back to normal immediately after the predetermined period of time. Accordingly, a required service amount may be expected. Furthermore, by transmitting a scheduling table to be used to receive multicast segments in advance, the multicast segments may be efficiently transmitted.

While the present invention has been particularly shown and described with reference to exemplary embodiments thereof, it will be understood by one skilled in the art that various changes in form and details may be made therein without departing from the spirit and scope of the invention as defined by the following claims and their equivalents.

What is claimed is:

1. A video on demand (VOD) transmission method using a divided transport stream (TS), the VOD transmission method comprising:
setting a division coefficient for dividing a TS;
dividing the TS into a unicast segment and multicast segments according to the division coefficient, wherein a size of the unicast segment is always greater than a size of any one of the multicast segments;
wherein the size of the multicast segment is determined by
calculating a number of packets of the multicast segments by applying a truncation of decimal points on a value obtained by dividing a total number of the TS packets by the division coefficient; and
calculating the multicast segment size by multiplying the number of packets of the multicast segments by a TS packet size; and
transmitting the unicast segment in a unicast manner and transmitting the multicast segments in a multicast manner after transmitting the unicast segments in a unicast manner.

2. The VOD transmission method of claim 1, wherein the dividing of the TS comprises:
extracting a total number of bytes of the TS;
calculating the total number of TS packets by dividing the total number of bytes of the TS by the TS packet size.

3. The VOD transmission method of claim 1, wherein the dividing of the TS comprises:
calculating a total number of packets of the multicast segments by multiplying the total number of packets of the multicast segments by a value obtained by subtracting one from the division coefficient; and
calculating a unicast segment size by multiplying the TS packet size by a value obtained by subtracting the total number of packets of the multicast segments from the total number of the TS packets.

4. The VOD transmission method of claim 1, wherein the transmitting of the unicast segment and the multicast segments comprises transmitting a scheduling table which is used to receive the multicast segments.

5. The VOD transmission method of claim 4, wherein the scheduling table comprises at least one of one or more multicast addresses and port numbers for transmitting one or more multicast segments.

6. The VOD transmission method of claim 4, wherein the transmitting of the multicast segments comprises repeatedly transmitting the multicast segments through one or more links according to the scheduling table.

7. The VOD transmission method of claim 6, wherein, when the multicast segments are repeatedly transmitted, a null packet is inserted into behind each of the multicast segments.

8. A video on demand (VOD) reception method using a divided transport stream (TS), the VOD reception method comprising:
receiving a content transmission request;
receiving a scheduling table from a transmission terminal;
receiving a unicast segment from the transmission terminal; and
receiving multicast segments from the transmission terminal after receiving a unicast segment from the transmission terminal; and
wherein a size of the unicast segment is always greater than or equal to a size of any one of the multicast segments; and
the size of each multicast segment is determined by
calculating a number of packets of the multicast segments by applying a truncation of decimal points on a value obtained by dividing a total number of the TS packets by a division coefficient; and calculating the multicast segment size by multiplying the number of packets of the multicast segments by a TS packet size.

9. The VOD reception method of claim 8, wherein the receiving of the multicast segments comprises:
transmitting a join message for receiving the multicast segments, to a multicast router, and joining a multicast group; and
forming a TS packet reception table of received TS packets and storing segments received through one or more links, in TS packets.

10. The VOD reception method of claim 9, wherein the forming of the TS packet reception table comprises forming the TS packet reception table by extracting at least one of values of a packet identifier (PID) field, a continuity counter field, and a presentation time stamp (PTS) field of each of the received TS packets.

11. The VOD reception method of claim 10, wherein the forming of the TS packet reception table and the storing of the segments comprise:
setting a first TS packet comprising values of all of the PID field, the continuity counter field, and the PTS field, as a reference packet; and
if a TS packet which is identical to the reference packet is received, terminating receiving of TS packets through a link through which the TS packet is received.

12. A video on demand (VOD) transmission system using a divided transport stream (TS), the VOD transmission system comprising:
a division coefficient setting unit setting a division coefficient for dividing a TS;
a segment size calculation unit calculating a unicast segment size and a multicast segment size for dividing the TS into a unicast segment and multicast segments according to the division coefficient, wherein the unicast segment size is always greater than the multicast segment size;
wherein the size of the multicast segment is determined by
calculating a number of packets of the multicast segments by applying a truncation of decimal points on a value obtained by dividing a total number of the TS packets by the division coefficient; and
calculating the multicast segment size by multiplying the number of packets of the multicast segments by a TS packet size; and
a segment transmission unit transmitting one or more divided segments by using a unicast method or a multicast method after transmitting the unicast segments in a unicast manner.

13. The VOD transmission system of claim 12, wherein the segment transmission unit comprises a scheduling table transmission unit transmitting a scheduling table which is used to receive the multicast segments.

\* \* \* \* \*